United States Patent [19]
Lamb

[11] Patent Number: 5,102,487
[45] Date of Patent: Apr. 7, 1992

[54] MANUFACTURING ROOFING SHINGLES
[75] Inventor: Glenn D. Lamb, Granville, Ohio
[73] Assignee: Owens-Corning Fiberglas Corporation, Toledo, Ohio
[21] Appl. No.: 548,453
[22] Filed: Jul. 2, 1990
[51] Int. Cl.⁵ ............................................. B32B 31/18
[52] U.S. Cl. .................................... 156/260; 156/264; 156/512
[58] Field of Search ...................... 156/260, 264, 512

[56] References Cited
U.S. PATENT DOCUMENTS 2,171,010  8/1939  Schuetz et al. .
3,624,975  12/1971 Morgan et al. .
3,921,358  11/1975 Bettoli .
4,499,702  2/1985  Turner .
4,729,814  3/1988  Jennus et al. .

Primary Examiner—Caleb Weston
Attorney, Agent, or Firm—Patrick P. Pacella; Ted C. Gillespie

[57] ABSTRACT

A method and apparatus for manufacturing roofing shingles having tabs and cutouts comprises a cutting cylinder for engaging a membrane and cutting it into continuous strips, where the circumference of the cutting cylinder and the length of the shingle have a common factor other than the length of the shingle, and an endcut cylinder for cutting the continuous shingle membrane strips into discrete roofing shingles, so that the pattern of tabs and cutouts will repeat itself periodically.

27 Claims, 2 Drawing Sheets

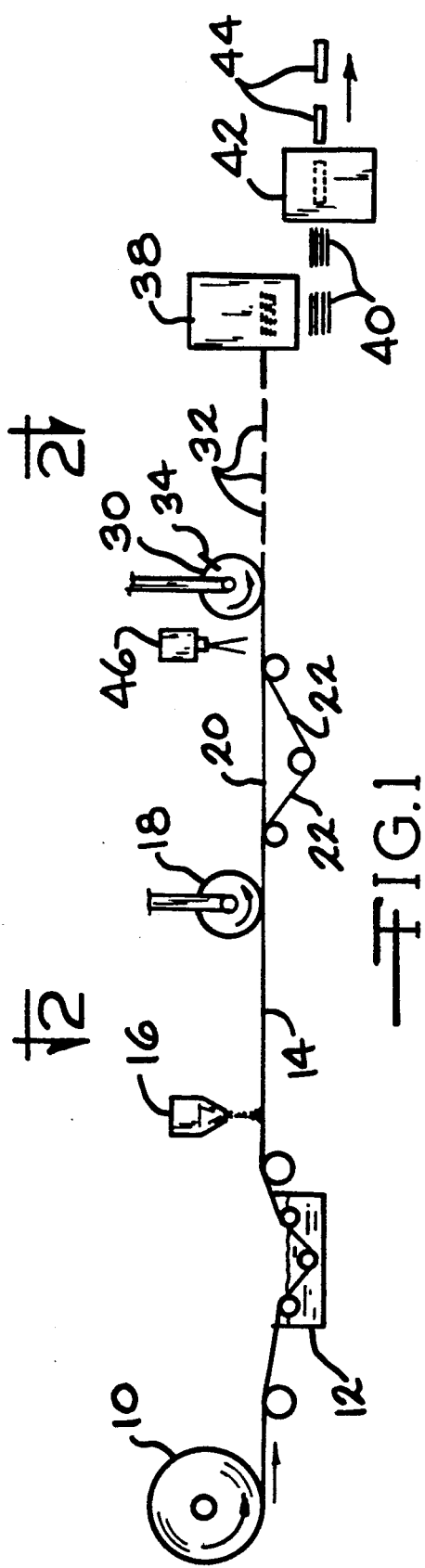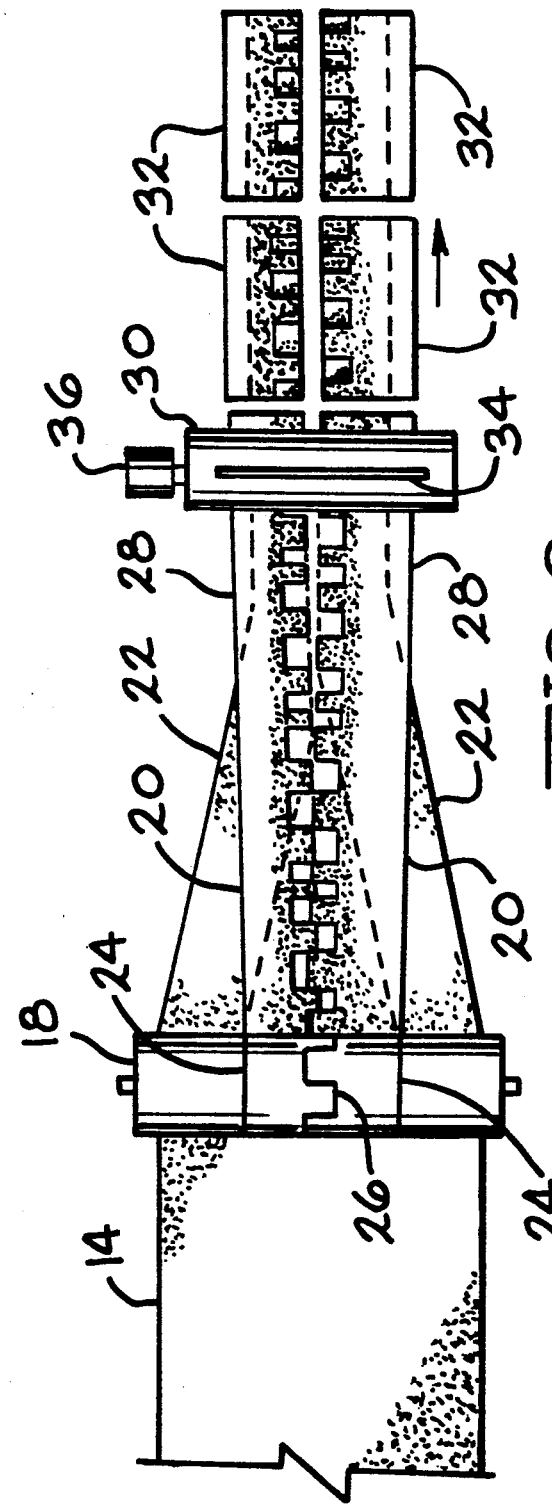

MANUFACTURING ROOFING SHINGLES

TECHNICAL FIELD

This invention pertains to manufacturing roofing shingles having tabs and cutouts. More particularly, this invention relates to engaging a shingle membrane with a cutting cylinder to cut the membrane into discrete roofing shingles, particularly of the asphalt type.

BACKGROUND OF THE INVENTION

It is well known in the roofing industry that irregularity or variation in shingle design provides a roof that is esthetically pleasing and in popular demand. Mass produced asphalt roofing shingles of the ordinary three-tab variety, when placed on the roof, result in a roof which sometimes appears flat, dimensionless and uninteresting. Shingle manufacturers have attempted to provide a better look to such roofs by using variations in the thickness and in the tab cutout design of shingles. The goal is to produce a random looking sequence or pattern of shingles on the roof, similar to the appearance given by a roof shingled with wood shingles having varying widths, lengths and thicknesses.

Innovations to improve the random-like character of shingles include the use of a laminated shingle, which consists of an overlay having tabs and cutouts, and an underlay, which is usually rectangular. These laminated shingles can be produced in an offline system whereby the overlays are formed and cut and later mated with an already cut underlay for lamination. Another method of making laminated shingles involves an inline system in which continuous overlay and underlay strips are laminated together and then the laminated continuous strips are cut with an endcut cylinder into individual shingles.

Typical shingle manufacturing techniques include the use of a cutting cylinder positioned to engage the continuous shingle membrane and cut the design of the shingle. For a typical three-tab shingle, the cutting cylinder has a circumference the same length as the length of the shingle. This length is typically either 36 inches or 39⅜ inches. In the case of a laminated shingle, where the cutting process and the lamination process occur prior to the end cutting process, the cutting cylinder does not divide the continuous shingle membrane into discrete roofing shingles. The laminated continuous membrane strips are cut into discrete roofing shingles by the endcut cylinder, positioned downstream from the cutting cylinder. The length of the shingle will always be the circumference of the endcut cylinder.

Where the cutting cylinder has a circumference equal to the length of the shingle, the relationship between the cutting cylinder and the length of the shingle is called a one-around system. Another system which may have been employed in the art is a two-around system, which uses a cutting cylinder with a circumference equal to twice the length of the shingles. With the two-around cutting cylinder, the cylinder cutting pattern can produce two distinct shingles with each revolution. In both the one-around and the two-around systems, the circumference of the cutting cylinder and the length of the shingle have a common factor—the length of the shingle. The one-around and two-around systems are limited in that there are at most only four different shingles produced: the two patterns around the circumference and their complements.

The third type of sequencing between the cutting cylinder and the endcut mechanism is the near random type relationship, where the endcut cylinder does the end cutting, but the cutting cylinder circumference is not equal to, or a multiple of, the shingle length.

In this system the length of the shingle differs from the circumference of the cutting cylinder. The shingles will then be cut always in a different place, thereby creating a multitude of shingle patterns, approaching a random shingle pattern, but repeating after a large number of revolutions. For example, if the cutting cylinder is 40 inches in circumference, and the endcut cylinder (and the length of the shingle) is 39 inches, then the shingle pattern will repeat itself after producing approximately 39 shingles.

The fourth type of sequencing between the cutting cylinder and the endcut mechanism is the random relationship. In such a case, there is no specific relationship between the length of the shingle and the circumference of the cutting cylinder. In the random cutting system the shingles are endcut downstream from the cutting cylinder, and the endcut cylinder is not maintained in phase with the shingle pattern. The shingles will then be cut in different places, thereby creating truly random shingle patterns.

The random and near-random endcut practice produces some undesirable characteristics. First, the use of a random or near-random cut does not always produce a random looking roof when the shingles are applied. Second, the use of a random or near-random cut with a laminated shingle having tabs and cutouts, can result in shingle tabs that are relatively narrow, such as being narrower in width than about 1.4 inches. It has been found that handling the shingle during the manufacturing process and during the installation process on the roof, where tabs are narrower than about 1.4 inches, can result in a tearing away of the tabs. This causes a maintenance problem in the plant and during installation, and alters the appearance of the shingle on the roof. It would be desirable to have a shingle-cutting pattern and system whereby shingle tabs are not made more narrow than about 1.4 inches in order to prevent the breaking off of the narrow shingle tabs.

STATEMENT OF THE INVENTION

A method and apparatus for manufacturing roofing shingles having tabs and cutouts has been invented in which the cutting cylinder and the length of the shingle have a common factor, other than the length of the shingle, so that the pattern of tabs and cutouts will repeat itself periodically. The use of a periodically repeating pattern gives the advantage that the specific design of all the shingles in the pattern is predetermined. Therefore, the shingles can be designed so that none of the tabs is narrower than about 1.4 inches. Further, since the circumference of the cutting cylinder and the length of the shingle have a common factor which is not the length of the shingle itself, a finite number of shingle patterns will be produced, but this number will be sufficient to ensure a fairly random appearance when the shingles are applied onto the roof.

According to this invention, there is provided apparatus for the manufacture of roofing shingles having tabs and cutouts comprising means for feeding a continuous shingle membrane along a path, a cutting cylinder positioned on the path to engage the membrane and cut it into continuous shingle membrane strips, where the circumference of the cutting cylinder and the length of the shingle have a common factor other than the length of the shingle, and an endcut cylinder for cutting the continuous shingle membrane strips into discrete roofing shingles, so that the pattern of tabs and cutouts will repeat itself periodically.

Preferably, the circumference of the cutting cylinder is greater than the length of a shingle. In a preferred embodiment of the invention, the length of the shingle is 3/5 of the circumference of the cutting cylinder.

In a specific embodiment of the invention the endcut cylinder is adapted with means for maintaining the endcut cylinder in phase with the repeated pattern of tabs and cutouts produced by the cutting cylinder. By keeping the endcut cylinder in phase with the cutting cylinder it will be assured that the predetermined pattern will always be repeated.

In another preferred embodiment in the invention the cutting pattern will result in all end tabs being greater than about 1.4 inches in the direction of the length of the shingle.

Most preferably, the apparatus of the invention includes means for dividing the membrane into underlay and overlay continuous shingle membrane strips, and further includes means for joining the underlay and overlay strips to form laminated shingles.

According to this invention, there is also provided a method for manufacturing roofing shingles having tabs and cutouts comprising feeding a continuous shingle membrane along a path, cutting the membrane into continuous shingle membrane strips with a cutting cylinder, where the circumference of the cutting cylinder and the length of the shingle have a common factor other than the length of the shingle, and cutting the continuous shingle membrane strips into discrete roofing shingles with an endcut cylinder so that the pattern of tabs and cutouts repeats itself periodically.

Preferably, the endcut cylinder is maintained in phase with the repeated pattern of tabs and cutouts produced by the cutting cylinder.

Also preferably, the membrane is cut into a pattern resulting in all end tabs being greater than about 1.4 inches in the direction of the length of the shingle.

In a specific embodiment of the invention, the membrane is divided into underlay and overlay continuous shingle membrane strips, and the underlay and overlay strips are joined to form laminated shingles.

According to this invention, there is provided a method of manufacturing roofing shingles having tabs and cutouts comprising feeding a continuous shingle membrane along a path, cutting the membrane into continuous shingle membrane strips with a cutting cylinder to form a repeated pattern of tabs and cutouts, cutting the continuous shingle membrane strips into discrete roofing shingles with an endcut cylinder, and maintaining the end cut cylinder in phase with the repeated pattern of tabs and cutouts so that the pattern of tabs and cutouts repeats itself periodically.

In a specific embodiment of the invention, the pattern of tabs and cutouts repeats once for every n revolutions of the cutting cylinder, where n is an integer from 3 to 9. Preferably, the pattern of tabs and cutouts repeats once for every three revolutions of the cutting cylinder.

BRIEF DESCRIPTION OF THE DRAWINGS

FIG. 1 is a schematic view in elevation of apparatus for manufacturing roofing shingles according to the principles of the invention.

FIG. 2 is a schematic plan view of a portion of the apparatus of FIG. 1, including the cutting cylinder, the end cut cylinder and the lamination process.

DESCRIPTION OF THE INVENTION

Figure 3:
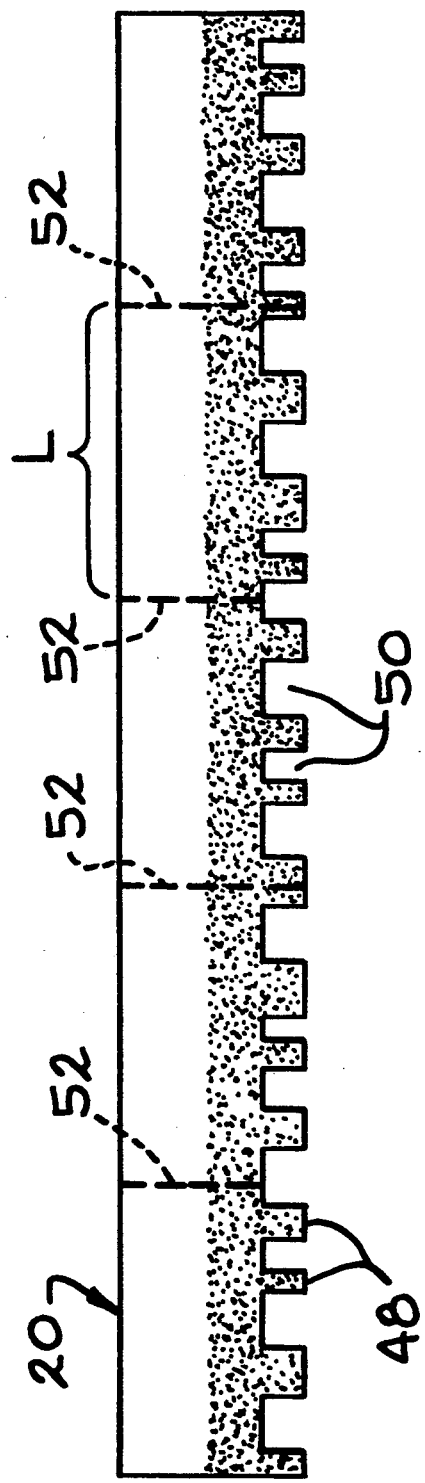
FIG. 3 is a schematic plan view of an overlay membrane strip showing how it would be divided into five consecutive shingles according to the principles of the invention.

This invention will be described in terms of manufacturing a laminated, granule-covered asphalt shingle. It is to be understood that the principles of the invention could be employed with nonlaminated shingles and with shingles made of other materials.

As shown in FIG. 1, shingles are produced by feeding glass fiber mat 10 through asphalt coater 12 to produce continuous shingle membrane 14. Granule applicator 16 applies the granules to the top of the continuous membrane in the manner well known in the art.

After a cooling process, not shown, the continuous membrane is fed along a path into engagement with cutting cylinder 18 which engages the continuous membrane and divides it into continuous shingle membrane strips: overlay strips 20 and underlay strips 22. As shown in FIG. 2, the cutting cylinder is adapted with three blades: two straight blades 24 divide the underlay strips from the overlay strips; patterned blade 26 cuts the overlay strip into two continuous membrane overlay strips having the regular pattern of tabs and cutouts.

The underlay membrane strips are positioned beneath the overlay membrane strips and laminated together by means, not shown, to produce laminated membrane strips 28. The means for joining the underlay and overlay are well known in the art, and could include, for example, guiding conveyor belts, other guide members, an adhesive applicator, and means for pressing the underlay and overlay together. The laminated membrane strips are fed into endcut cylinder 30 which engages the laminated membrane strips and divides them into discrete roofing shingles 32. The endcut cylinder can be of any type suitable for cutting the strip material into individual shingles, having blade 34 and driven by motor 36. The discrete shingles produced by this apparatus are laminated shingles having the saw-tooth overlay with tabs and cutouts on one edge, and having a generally rectangular underlay.

After discrete shingles are formed, they can be processed with commonly used apparatus for handling such shingles, such as shingle stacker 38 to form stacks of shingles 40, and bundle packager 42 to form shingle bundles 44.

The shingle apparatus is adapted with sensor 46 which is connected to the endcut cylinder motor in order to keep the endcut cylinder in phase with the pattern produced by the cutting cylinder. Preferably, the sensor is an optical device which can sense the pattern of tabs and cutouts on the laminated membrane strips and which can be adapted with a controller, not shown, to control the rotational speed of the endcut cylinder motor. Any other means suitable for maintaining the endcut cylinder rotation in phase with the shingle pattern can be employed. A suitable phase control device should be available from UIP Corporation, Chicago, Ill.

The circumference of the cutting cylinder and the length of the shingle have a specifically defined relationship. The length of the shingle is equal to the circumference of the endcut cylinder. The circumference of the cutting cylinder and the length of the shingle have a common factor other than the length of the shingle. For example a commonly produced shingle length is 39 inches. In such a case, the preferable circumference of the cutting cylinder is 65 inches. In this case, the length of the shingle is 3/5 of the circumference of the cutting cylinder. Another commonly produced shingle is a 39⅜ inch shingle, in which case the circumference of the cutting cylinder would be about 65⅝ inches. A similar pattern would hold true for a 36 inch shingle, which would use a cutting cylinder of about 60 inches. In each of these three cases the length of the shingle is 3/5 of the circumference of the cutting cylinder.

In each of the above cases there is a common factor which is other than the length of the shingle. For the 39 inch shingle, for example, the common factor is 13 inches. The 39 inch shingle and the 65 inch cutting cylinder circumference are both, multiples of 13 inches. The same holds true for the 39⅜ inch shingle, which is a multiple of a 13⅛ factor. Likewise, the 36 inch shingle is a multiple of a 12 inch common factor.

The result of having a common factor other than the length of the shingle is that a specific number of rotations of the cutting cylinder will produce a predetermined number of shingle patterns, and the shingle pattern will be repeated each time the cutting cylinder makes that specific number of revolutions. For example, if the shingle is 39 inches and the circumference of the cutting cylinder is 65 inches, three revolutions of the cutting cylinder will produce a pattern of tabs and cutouts 195 inches long. Every 195 inches this pattern will repeat 195 inches is exactly the length of 5 shingles. Thus, there will be 5 shingles produced in a repeated pattern.

FIG. 3 shows a portion of an overlay membrane strip showing the pattern of tabs 48 and cutouts 50 which would be produced by three revolutions of the cutting cylinder. It is understood that the term "cutout" is the space between two tabs in an overlay membrane. The cutout is formed by the complementary tab in the opposite half of the overlay membrane. This pattern would be repeated endlessly every three revolutions of the cutting cylinder. Phantom lines 52 indicate where the membrane strips would be cut into discrete roofing shingles, each having a length L. As can be seen, each of the five shingles produced would be different. It can be appreciated that the complementary shingles would produce an additional five shingle designs which would be different from the five shingles shown in FIG. 3, thereby creating a total of ten different shingles using a pattern where the length of the shingle is 3/5 of the circumference of the cutting cylinder.

Although the overlay membrane strip shown in FIG. 3 shows a pattern where the tabs and cutouts repeat once for every three revolutions of the cutting cylinder, the circumference of the cutting cylinder could be such that the pattern of tabs and cutouts repeats itself for a different number of revolutions. Preferably, the pattern of tabs and cutouts would repeat itself once every n revolutions of the cutting cylinder, where n is an integer from 3 to 9.

One advantage of having a repeated pattern of tabs and cutouts, coupled with the running of the endcut cylinder in phase with the repeated pattern of tabs and cutouts, is that the manufacturer is assured of the exact design of each shingle produced. This enables the manufacturer to avoid making shingles having narrow tabs. Preferably, the pattern of tabs and cutouts results in all end tabs being greater than about 1.4 inches in the direction of the length L of the shingle. Most preferably, no tab is narrower than 2 inches. A pattern that assures the absence of narrow end tabs avoids the problem of having narrow end tabs break off, thereby eliminating a waste problem and a possible negative effect on the appearance of the shingles on the roof.

It will be evident from the foregoing that various modifications can be made to this invention. Such, however, are considered as being within the scope of the invention.

INDUSTRIAL APPLICABILITY

This invention will be found to be useful in the production of granule coated discrete roofing shingles suitable for use in residential and commercial roofing applications.

I claim:

1. Apparatus for the manufacture of roofing shingles having tabs and cutouts comprising means for feeding a continuous shingle membrane along a path, a cutting cylinder positioned on the path to engage the membrane and cut it into continuous shingle membrane strips, where the circumference of the cutting cylinder and the length of a discrete shingle have a common factor other than the length of the discrete shingle, and an endcut cylinder for cutting the continuous shingle membrane strips into discrete roofing shingles, so that the pattern of tabs and cutouts will repeat itself periodically, the cutting cylinder being adapted with a cutting pattern which results in all end tabs being greater than about 1.4 inches in the direction of the length of the shingle.

2. The apparatus of claim 1 in which the length of the shingle is 3/5 of the circumference of the cutting cylinder.

3. The apparatus of claim 2 in which the length of the shingle is about 36 inches, and the circumference of the cutting cylinder is about 60 inches.

4. The apparatus of claim 2 in which the length of the shingle is about 39 inches, and the circumference of the cutting cylinder is about 65 inches.

5. The apparatus of claim 2 in which the length of the shingle is about 39⅜ inches, and the circumference of the cutting cylinder is about 65⅝ inches.

6. The apparatus of claim 1 further including means for dividing the membrane into underlay and overlay continuous shingle membrane strips, and means for joining the underlay and overlay strips to form laminated shingles.

7. The apparatus of claim 1 including means for maintaining the endcut cylinder in phase with the repeated pattern of tabs and cutouts produced by the cutting cylinder.

8. The method of manufacturing roofing shingles having tabs and cutouts comprising feeding a continuous shingle membrane along a path, cutting the membrane into continuous shingle membrane strips with a cutting cylinder, where the circumference of the cutting cylinder and the length of a discrete shingle have a common factor other than the length of the discrete shingle with the length of the shingle being 3/5 of the circumference of the cutting cylinder, and cutting the continuous shingle membrane strips into discrete roofing shingles with an endcut cylinder so that the pattern of tabs and cutouts repeats itself periodically.

9. The method of claim 8 comprising cutting the membrane into a pattern which results in all end tabs being greater than about 1.4 inches in the direction of the length of the shingle.

10. The method of claim 8 further including dividing the membrane into underlay and overlay continuous shingle membrane strips, and joining the underlay and overlay strips to form laminated shingles.

11. The method of claim 8 in which the circumference of the cutting cylinder is greater than the length of a shingle.

12. The method of claim 8 including maintaining the endcut cylinder in phase with the repeated pattern of tabs and cutouts produced by the cutting cylinder.

13. The method of manufacturing roofing shingles having tabs and cutouts comprising feeding a continuous shingle membrane along a path, cutting the membrane into continuous shingle membrane strips with a cutting cylinder to form a repeated pattern of tabs and cutouts, cutting the continuous shingle membrane strips into discrete roofing shingles with an endcut cylinder, and maintaining the endcut cylinder in phase with the repeated pattern of tabs and cutouts so that the pattern of tabs and cutouts repeats itself periodically once for every n revolutions of the cutting cylinder, where n is an integer from 3 to 9.

14. The method of claim 13 in which n is 3.

15. The method of claim 13 further including dividing the membrane into underlay and overlay continuous shingle membrane strips, and joining the underlay and overlay strips to form laminated shingles.

16. The method of claim 13 comprising cutting the membrane into a pattern which results in all end tabs being greater than about 1.4 inches in the direction of the length of the shingle.

17. Apparatus for the manufacture of roofing shingles having tabs and cutouts comprising means for feeding a continuous shingle membrane along a path, a cutting cylinder positioned on the path to engage the membrane and cut it into continuous shingle membrane strips, where the circumference of the cutting cylinder and the length of a discrete shingle have a common factor other than the length of the discrete shingle with the length of the discrete shingle being 3/5 of the circumference of the cutting cylinder, and an endcut cylinder for cutting the continuous shingle membrane strips into discrete roofing shingles, so that the pattern of tabs and cutouts will repeat itself periodically.

18. The apparatus of claim 17 in which the length of the shingle is about 36 inches, and the circumference of the cutting cylinder is about 60 inches.

19. The apparatus of claim 17 including means for maintaining the endcut cylinder in phase with the repeated pattern of tabs and cutouts produced by the cutting cylinder.

20. The apparatus of claim 17 in which cylinder is adapted with a cutting pattern which results in all end tabs being greater than about 1.4 inches in the direction of the length of the shingle.

21. The apparatus of claim 17 further including means for dividing the membrane into underlay and overlay continuous shingle membrane strips, and means for joining the underlay and overlay strips to form laminated shingles.

22. The apparatus of claim 17 in which the length of the shingle is about 39 inches, and the circumference of the cutting cylinder is about 65 inches.

23. The apparatus of claim 17 in which the length of the shingle is about 39⅜ inches, and the circumference of the cutting cylinder is about 65⅝ inches.

24. The method of manufacturing roofing shingles having tabs and cutouts comprising feeding a continuous shingle membrane along a path, cutting the membrane into continuous shingle membrane strips with a cutting cylinder, where the circumference of the cutting cylinder and the length of a discrete shingle have a common factor other than the length of the discrete shingle, and cutting the continuous shingle membrane strips into discrete roofing shingles with an endcut cylinder so that the pattern of tabs and cutouts repeats itself periodically, where the cutting of the membrane by the cutting cylinder and the endcut cylinder results in discrete roofing shingles having all end tabs being greater than about 1.4 inches in the direction of the length of a shingle.

25. The method of claim 24 in which the length of the shingle is 3/5 of the circumference of the cutting cylinder.

26. The method of claim 24 including maintaining the endcut cylinder in phase with the repeated pattern of tabs and cutouts produced by the cutting cylinder.

27. The method of claim 24 further including dividing the membrane into underlay and overlay continuous shingle membrane strips, and joining the underlay and overlay strips to form laminated shingles.

* * * * *